(12) United States Patent
Bailey et al.

(10) Patent No.: US 10,604,730 B2
(45) Date of Patent: Mar. 31, 2020

(54) ALCOHOLIC BEVERAGE MATURING DEVICE

(71) Applicant: Terressentia Corporation, Ladson, SC (US)

(72) Inventors: Edward Bailey, Johns Island, SC (US); Norma Lindsay, Johns Island, SC (US)

(73) Assignee: Terressentia Corporation, Ladson, SC (US)

( * ) Notice: Subject to any disclaimer, the term of this patent is extended or adjusted under 35 U.S.C. 154(b) by 46 days.

(21) Appl. No.: 14/885,605

(22) Filed: Oct. 16, 2015

(65) Prior Publication Data

US 2017/0107467 A1 Apr. 20, 2017

(51) Int. Cl.
*C12H 1/16* (2006.01)
*C12H 1/22* (2006.01)

(52) U.S. Cl.
CPC .............. *C12H 1/16* (2013.01); *C12H 1/165* (2013.01); *C12H 1/22* (2013.01)

(58) Field of Classification Search
CPC .................................. C12H 1/16; C12H 1/22
USPC .... 99/275, 277, 277.1, 277.2; 426/234, 238, 426/248, 322, 590, 592
See application file for complete search history.

(56) References Cited

U.S. PATENT DOCUMENTS

| 4,210,676 A | 7/1980 | Dudar et al. |
| 4,792,459 A * | 12/1988 | Krause .................. C12G 3/12 203/98 |
| 5,173,318 A | 12/1992 | Leu et al. |
| 7,056,549 B2 | 6/2006 | Wilson et al. |
| 7,063,867 B2 * | 6/2006 | Tyler, III ................. C12H 1/16 426/237 |
| 7,357,835 B2 * | 4/2008 | McCausland ........ B01D 9/0013 117/2 |
| 2003/0110951 A1 | 6/2003 | Tyler, III et al. |
| 2010/0062120 A1 * | 3/2010 | Jang ......................... C12H 1/16 426/234 |

(Continued)

FOREIGN PATENT DOCUMENTS

| CN | 203 602 600 | 5/2014 |
| JP | 25-1227 | 4/1925 |
| JP | 53-110996 | 9/1978 |

(Continued)

OTHER PUBLICATIONS

Preston et al., "Accelerated Aging Technology", http://widowjane.com/resources/, retrieved on Oct. 16, 2015, 49 pages.

(Continued)

*Primary Examiner* — Phuong T Nguyen
(74) *Attorney, Agent, or Firm* — Moore & Van Allen PLLC; Henry B. Ward, III

(57) ABSTRACT

An alcoholic beverage maturing device is provided including a container and an ultrasonic energy device. The container defines an interior volume for holding an alcoholic beverage and the ultrasonic energy device is configured for subjecting the alcohol beverage within the interior volume of the container to ultrasonic energy. The ultrasonic energy device defines a range of exposure of ultrasonic energy to the interior volume of the container that is greater than 180 degrees in order to efficiently subject the alcoholic beverage contained therein to ultrasonic energy.

22 Claims, 8 Drawing Sheets

(56) References Cited

U.S. PATENT DOCUMENTS

2013/0101710 A1    4/2013  Ha'Eri
2016/0129407 A1    5/2016  Wrosch et al.

FOREIGN PATENT DOCUMENTS

| JP | 54-119098 | 9/1979 |
|---|---|---|
| JP | 3-83100 | 8/1991 |
| JP | 2012 147748 | 8/2012 |
| JP | 2012-153303 | 8/2012 |
| JP | 2012-239026 | 12/2012 |
| JP | 2013-009283 | 1/2013 |
| WO | 03/016459 | 2/2003 |
| WO | WO 2012/093517 | 7/2012 |

OTHER PUBLICATIONS

Extended European Search Report issued by the European Patent Office for PCT/US2016056338, dated Apr. 16, 2019.

Australian Examination Report No. 1 for issued by the Australian Government for Australian Patent Application No. 2016338757, dated May 9, 2018.

Australian Examination Report No. 2 for issued by the Australian Government for Australian Patent Application No. 2016338757, dated Oct. 5, 2018.

Eurasian Office Action issued by the Eurasian Patent Organization for Euranian Patent Application No. 201890975, dated May 21, 2018.

Feng, Hao et al. "High-Powed Ultrasound in Surface Cleaning and Decontamination". Ultrasound Technologies for Food and Bioprocessing, pp. 547-548; Springer. dated Nov. 17, 2010.

Japanese Office Action issued by the Japanese Patent Office for Japanese Patent Application No. 2016-203378, dated Sep. 19, 2017.

First Examination Report issued by the New Zealand Intellectual Property Office for New Zealand Patent Application No. 742482 dated Aug. 13, 2018.

Office Action issued by the Eurasian Patent Office for Eurasian Patent Application No. 201890975/31 dated Apr. 22, 2019.

Office Action No. 5697 issued by the Colombian Patent and Trademark Office for Colombian Patent Application No. NC2018/0004300 dated May 15, 2018.

Office Action No. 6847 issued by the Colombian Patent and Trademark Office for Colombian Patent Application No. NC2018/0004300 dated Jul. 25, 2019.

Brazilian Office Action issued by the Brazilian Patent Office for corresponding Brazilian Patent Application No. 112018007645-7, dated Oct. 11, 2016, 5 pages.

\* cited by examiner

ALCOHOLIC BEVERAGE MATURING DEVICE

FIELD OF THE INVENTION

The present subject matter relates generally to a device for maturing an alcoholic beverage.

BACKGROUND OF THE INVENTION

Alcoholic beverages, such as vodka, tequila, rum, bourbon, scotch, brandy and the like are generally produced through a distillation process. Once produced, in order to improve the taste and smoothness of the beverage, many products are aged. For instance, bourbons and scotches are typically aged at least three years prior to being sold for consumption. Rums, tequilas and brandies are aged for varying amounts from two to ten years or even more.

In the past, alcoholic beverages, such as bourbon and scotch, for example, have been aged in oak barrels or casks over long periods of time. The beverages are aged in the wooden containers in order to remove unwanted components and to impart certain colors, flavors and fragrances to enhance the smoothness and taste of the beverage. During the aging process, the distillates can react with components in the wood, such as lignins, tannins, and carbohydrates. Distillation and aging techniques have changed little over the last several hundred years.

Unfortunately, the costs of conventional aging processes are enormous, often accounting for half to two-thirds or even more of the cost of the spirit to consumers. For instance, to ensure product quality, the oak barrels should be stored in warehouses under carefully controlled temperature and humidity conditions for very long periods of time. The barrels are not only very expensive to manufacture but also take up a significant amount of space. Further, much of the alcoholic product can be lost during aging due to evaporation through the pores of the barrels.

In addition, natural barrel aging also presents limitations to the chemical reactions which are believed to improve spirit flavor and quality. For instance, oxidation and esterification reactions which are believed to assure spirit smoothness and flavor tend to be inefficient and unable to proceed to completeness at the temperatures which are preferred for limiting loss of product due to evaporation. Thus a balance must be struck with aging processes between increased temperature in order to promote desired chemical reactions and lower temperature desired to limit product evaporation.

Certain processes for rapidly maturing alcoholic beverages have been developed that involve subjecting the alcoholic beverages to ultrasonic energy. For example, U.S. Pat. No. 7,063,867 to Tyler, III et al., which is incorporated herein by reference as to all relevant matters, is directed to a process for maturing alcoholic beverages including subjecting the alcoholic beverages to a disclosed amount of ultrasonic energy. However, a need still exists for a device capable of efficiently subjecting the alcoholic beverage to ultrasonic energy. Accordingly, a device for maturing alcoholic beverages capable of efficiently subjecting the alcoholic beverage to ultrasonic energy would be beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an alcoholic beverage maturing device is provided. The alcoholic beverage maturing device includes a container defining an interior volume for holding an alcoholic beverage. The alcoholic beverage maturing device additionally includes an ultrasonic energy device for subjecting the alcoholic beverage within the interior volume of the container to ultrasonic energy. The ultrasonic energy device defines a range of exposure of ultrasonic energy to the interior volume of the container greater than 180 degrees.

In an exemplary aspect of the present disclosure, a method of maturing an alcoholic beverage using an alcoholic beverage maturing device is provided. The alcoholic beverage maturing device includes a container having an interior volume and an ultrasonic energy device defining a range of exposure to the interior volume greater than 180 degrees. The method includes providing an alcoholic beverage to be matured to the interior volume of the container, and providing ultrasonic energy to the alcoholic beverage within the interior volume of the container with the ultrasonic energy device in a range of directions exceeding 180 degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
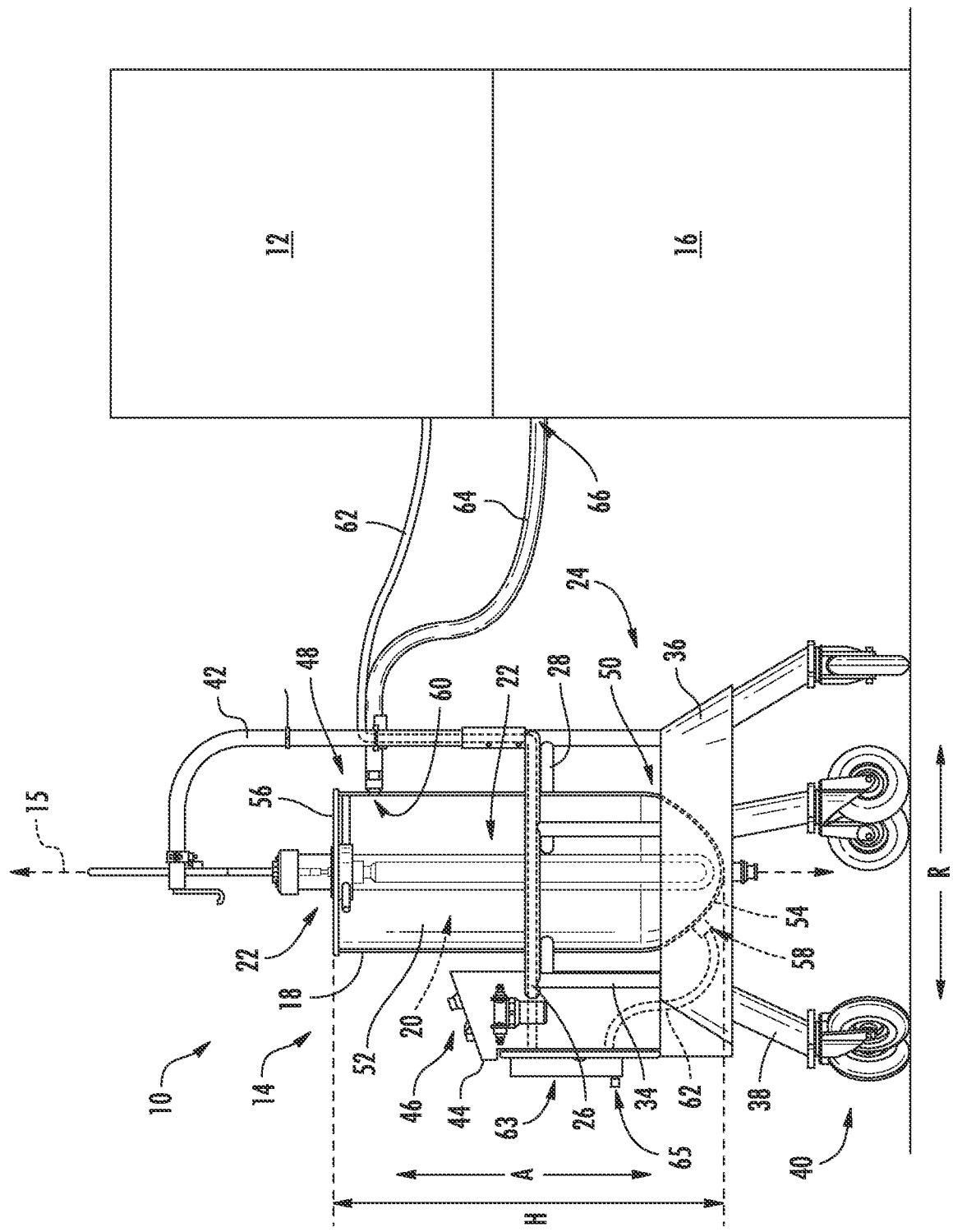
FIG. 1 is a side view of a system for maturing alcoholic beverages in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 depicts a system 10 for efficiently maturing alcoholic beverages. As used herein, the term "alcoholic beverages" refers generally to any distilled beverage, such as vodka, tequila, rum, whiskey, bourbon, scotch, brandy, etc.

The system 10 generally includes an infeed storage tank 12, an alcoholic beverage maturing device 14, and an outfeed storage tank 16. The infeed storage tank 12 may contain a volume of alcoholic beverage to be matured by the maturing device 14. By contrast, the outfeed storage tank 16 may capture and hold a volume of alcoholic beverage that has been matured by the maturing device 14. For the embodiment depicted, the infeed storage tank 12 is positioned above the outfeed storage tank 16, such that the alcoholic beverage may be at least in part gravity fed from the infeed storage tank 12, through the alcoholic beverage maturing device 14, and to the outfeed storage tank 16.

The infeed storage tank 12 and outfeed storage tank 16 may each be approximately the same size tanks, and further each of the infeed storage tank 12 and outfeed storage tank 16 may be formed of any suitable material. For example, in certain exemplary embodiments, one or both of the infeed storage tank 12 or outfeed storage tank 16 may be formed of a suitable plastic or metal material Referring now also to FIGS. 2 and 3, a perspective view and a front view of the exemplary alcoholic beverage maturing device 14 included in the system 10 of FIG. 1 are provided. The alcoholic beverage maturing device 14 defines an axial direction A (with an axial centerline 15 depicted in phantom for reference), a radial direction R, and a circumferential direction C. For the embodiment depicted, the alcoholic beverage maturing device 14 is configured as a vertically oriented maturing device. Accordingly, for the embodiment depicted, the axial direction A may be substantially parallel to a vertical direction.

Additionally, the alcoholic beverage maturing device 14 generally includes a container 18 defining an interior volume 20 for holding an alcoholic beverage and an ultrasonic energy device 22 for subjecting alcoholic beverage within the interior volume 20 of the container 18 to ultrasonic energy. For the embodiment depicted, the container 18 is held in position by a mobile frame 24, such that the alcoholic beverage maturing device 14 may be easily moved if desired. More specifically, the mobile frame 24 includes a circumferential support bar 26 extending around the container 18 generally along the circumferential direction C, with a plurality of radial stabilizing bars 28 extending inwardly along the radial direction R from the circumferential support bar 26 to the container 18. At a distal end 30 of each of the radial stabilizing bars 28, the radial stabilizing bars 28 include a bumper 32 configured to contact the container 18 and stabilize the container 18. Each of the bumpers 32 may be formed of any suitable material, such as an elastomeric or other rubber material, e.g., to avoid damaging the container 18 and/or to grip the container 18.

The mobile frame 24 additionally includes a plurality of axial support bars 34 extending generally along the axial direction A, which connect the circumferential support bar 26 to a skirt 36 extending around a base of the container 18 in the circumferential direction C. The skirt 36 may attach to or include one or more members (not shown) configured to support the container 18. The skirt 36 is, in turn, attached to a plurality of legs 38, each leg 38 having a caster or roller 40 designed to allow the alcoholic beverage maturing device 14 to be moved to a desired location.

Moreover, the mobile frame 24 further includes a vertically extending support bar 42 extending upward along the vertical direction from the circumferential support bar 26 and over a top of the container 18. As will be discussed below, one or more electrical wires or other control elements may be suspended from a portion of the support bar 42 positioned over the top of the container 18.

It should be appreciated, of course, that the exemplary mobile frame 24 depicted is provided by way of example only and that in other exemplary embodiments, the maturing device 14 may include any other suitable frame for stabilizing the container 18. For example, in other exemplary embodiments, the mobile frame 24 may instead be a stationary frame that is not configured to be easily moved if desired. Additionally, in other exemplary embodiments, one or more aspects of the frame may be formed integrally with the container 18 such that at least a portion of the container 18 is also considered the frame.

Additionally, a control panel 44 is provided attached to the mobile frame 24 having a plurality of controls 46 thereon. The controls 46 may be configured to control one or more operations of the alcoholic beverage maturing device 14, as will be discussed below. In certain exemplary embodiments, one or more of the controls 46 may be pneumatically operated controls to minimize the amount of electronics positioned proximate the container 18.

The container 18 of the alcoholic beverage maturing device 14 extends generally along the axial direction A between a first end and a second end. Specifically, the exemplary alcoholic beverage maturing device 14 depicted is vertically oriented. Accordingly, for the embodiment depicted, the first end may be considered a top end 48 and the second end may be considered a bottom end 50. Additionally, the exemplary container 18 defines a substantially cylindrical shaped body 52 between the first and second ends 48, 50, and includes an integrally formed, substantially domed or semi-spherical shape cap 54 at the bottom end 50. By contrast, the container 18 includes a removable lid 56 at the top end 48 enclosing the interior volume 20 defined by the container 18. However, in other exemplary embodiments, the container 18 may have any other suitable shape and/or orientation. For example, in other exemplary embodiments, the container 18 may have a squared, rectangular, ovular, or other polygon or curved cross-sectional shape. Additionally, although the exemplary container 18 is depicted oriented along the vertical direction, in other exemplary embodiments, the container 18 may instead be oriented in any other suitable direction. For example, in other exemplary embodiments, the container 18 may be oriented generally along a horizontal direction, such that the axial direction A of the container 18 extends substantially parallel to the horizontal direction.

Referring still to the embodiment depicted, the container 18 is formed of a transparent, semi-transparent, or translucent material to allow a user to view the interior volume 20 of the container 18. For example, the container 18 may be formed of a glass material, a transparent plastic material (such as those known by the trade names Plexiglas or Acrylite), a borosilicate glass, a quartz glass, a polycarbonate glass material, or any other suitable materials. Alternatively, however, the container 18 may be formed of a non-transparent material, such as a suitable metal material, non-transparent plastic material, or ceramic material.

The container 18 additionally defines an inlet 58 (shown in phantom in FIG. 1) and an outlet 60. For the exemplary system 10 of FIG. 1, the inlet 58 is in fluid communication with the infeed storage tank 12 via an inlet conduit 62. Similarly, the outlet 60 is in fluid communication with the outfeed storage tank 16 via an outlet conduit 64.

Figure 4:
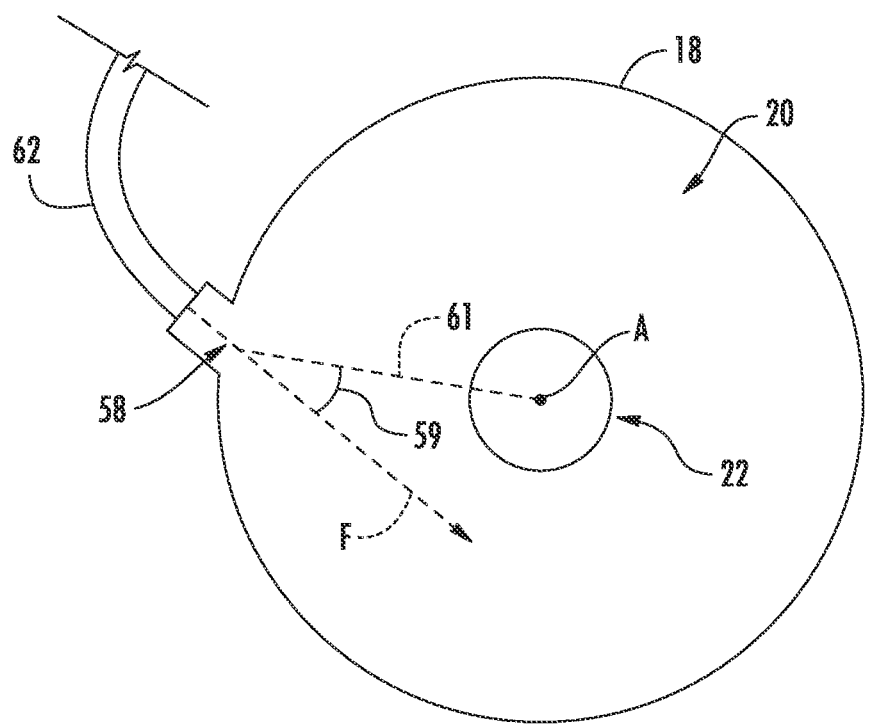
FIG. 4 is a schematic, cross-sectional view of a bottom portion of the exemplary alcohol beverage maturing device of FIG. 2.

Referring now also to FIG. 4, a top, cross-sectional, schematic view of the inlet 58 defined by the container 18 is provided. As shown, the inlet 58 for the embodiment depicted defines an angle with the radial direction of the alcoholic beverage maturing device 14. More specifically, the inlet 58 defines an inlet flow direction F, and the inlet flow direction F defines an angle 59 with a radial reference line 61 extending from the inlet 58 to the central axis 15 of the alcoholic beverage maturing device 14. The angle 59 may, in certain embodiments, be any angle greater than zero. For example, the angle 59 may be between about five degrees and about eighty-five degrees, such as between about fifteen degrees and about seventy-five degrees, such as between about thirty degrees and about forty-five degrees. Such a configuration may generate a desired flow of the alcoholic beverage through the container 18. For example, such a configuration may generate a spiral-shaped flow of the alcoholic beverage through the container 18, encircling the ultrasonic energy device 22 as the alcoholic beverage flows along the axial direction A towards the outlet 60 (e.g., in a corkscrew/helical flow).

Notably, referring again to FIGS. 1 through 3, the alcoholic beverage maturing device 14 may be configured as a continuous flow alcoholic beverage maturing device. More specifically, a continuous flow of alcoholic beverage to be matured may flow from the inlet 58 of the container 18, through the container 18 (e.g., in the manner described above with reference to FIG. 4), and to the outlet 60 of the container 18. The amount of exposure of ultrasonic energy from the ultrasonic energy device 22 to the alcohol beverage to be matured by the maturing device 14 may thus be controlled by regulating a flowrate of the alcohol beverage through the container 18 of the maturing device 14. Accordingly, as depicted partially in phantom, a portion of the inlet conduit 62 may extend through the various frame members of the frame 24 to the control panel 44 of the container 18. The controls 46 of the control panel 44 include a flow metering device 63 with a control knob 65. The flow metering device 63 and control knob 65 are configured to control a flow rate of the alcoholic beverage through the container 18 of the maturing device 14 by regulating a flow through the inlet conduit 62.

Further, as discussed above, the alcoholic beverage to be matured in the infeed storage tank 12 may be gravity fed to the maturing device 14. Similarly, the matured alcoholic beverage from the maturing device 14 may be gravity fed to the outfeed storage tank 16. For example, as shown, the outlet 60 is positioned proximate the top end 48 of the container 18 and the inlet 58 is positioned proximate the bottom end 50 of the container 18. Additionally, the outlet 60 of the container 18 is positioned above an inlet 66 of the outfeed storage tank 16 to assist in facilitating such gravity feeding.

It should be appreciated, however, that in other exemplary embodiments, the system 10 may provide for a flow of alcoholic beverages to and through the maturing device 14 in any other suitable manner. For example, in other embodiments, the alcoholic beverage may be fed through the alcoholic beverage maturing device 14 using one or more pumps or other similar devices. Accordingly, in such exemplary embodiments, the infeed storage tank 12 and/or the outfeed storage tank 16 may be positioned at any suitable location and elevation relative to the alcoholic beverage maturing device 14. Additionally, in such an exemplary embodiment, the pumps or other similar devices may be in operable communication with the controls 46 of the control panel 44.

Figure 2:
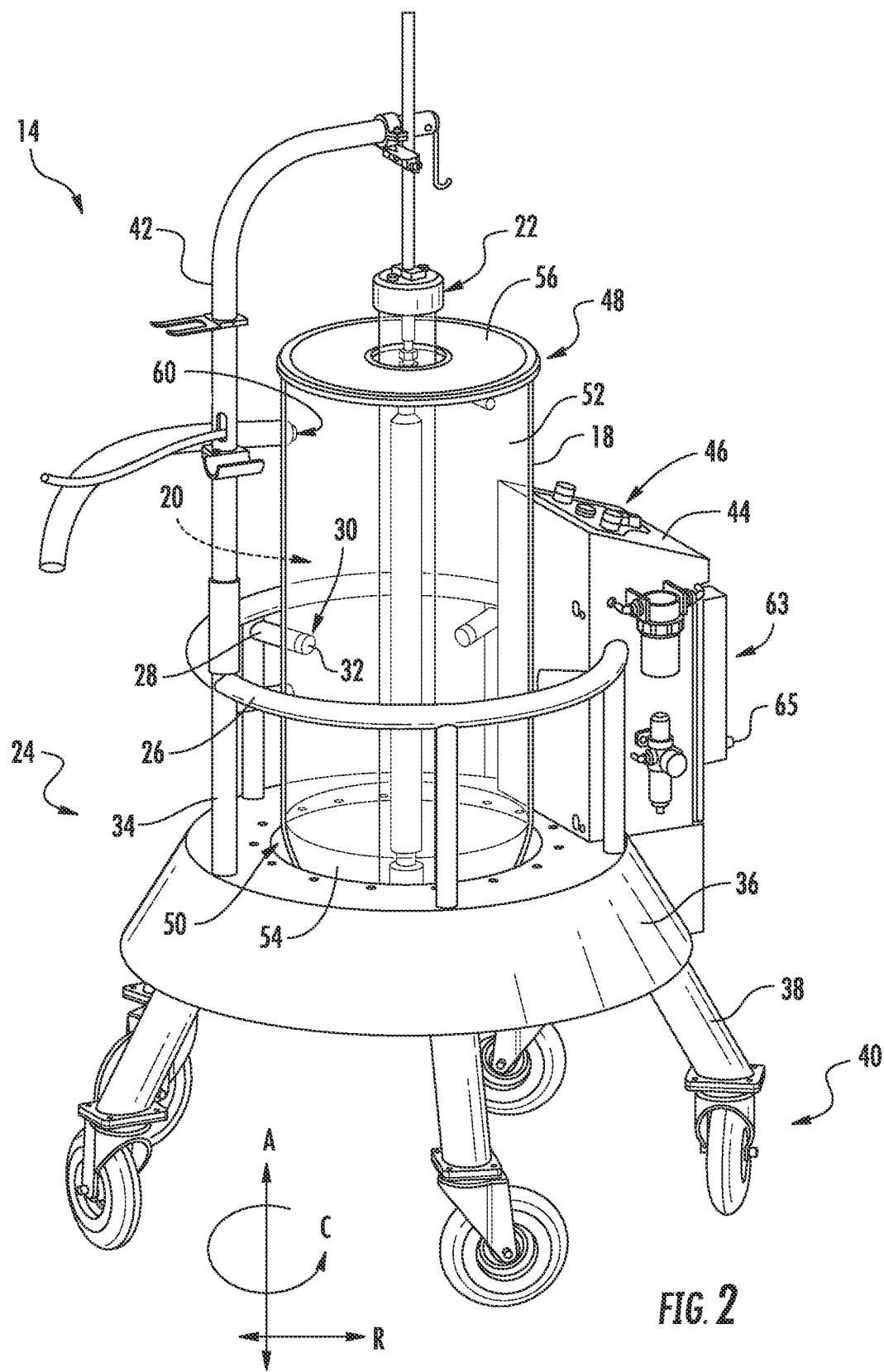
FIG. 2 is a perspective view of an alcoholic beverage maturing device from the exemplary system of FIG. 1 in accordance with an exemplary embodiment of the present disclosure.
Figure 3:
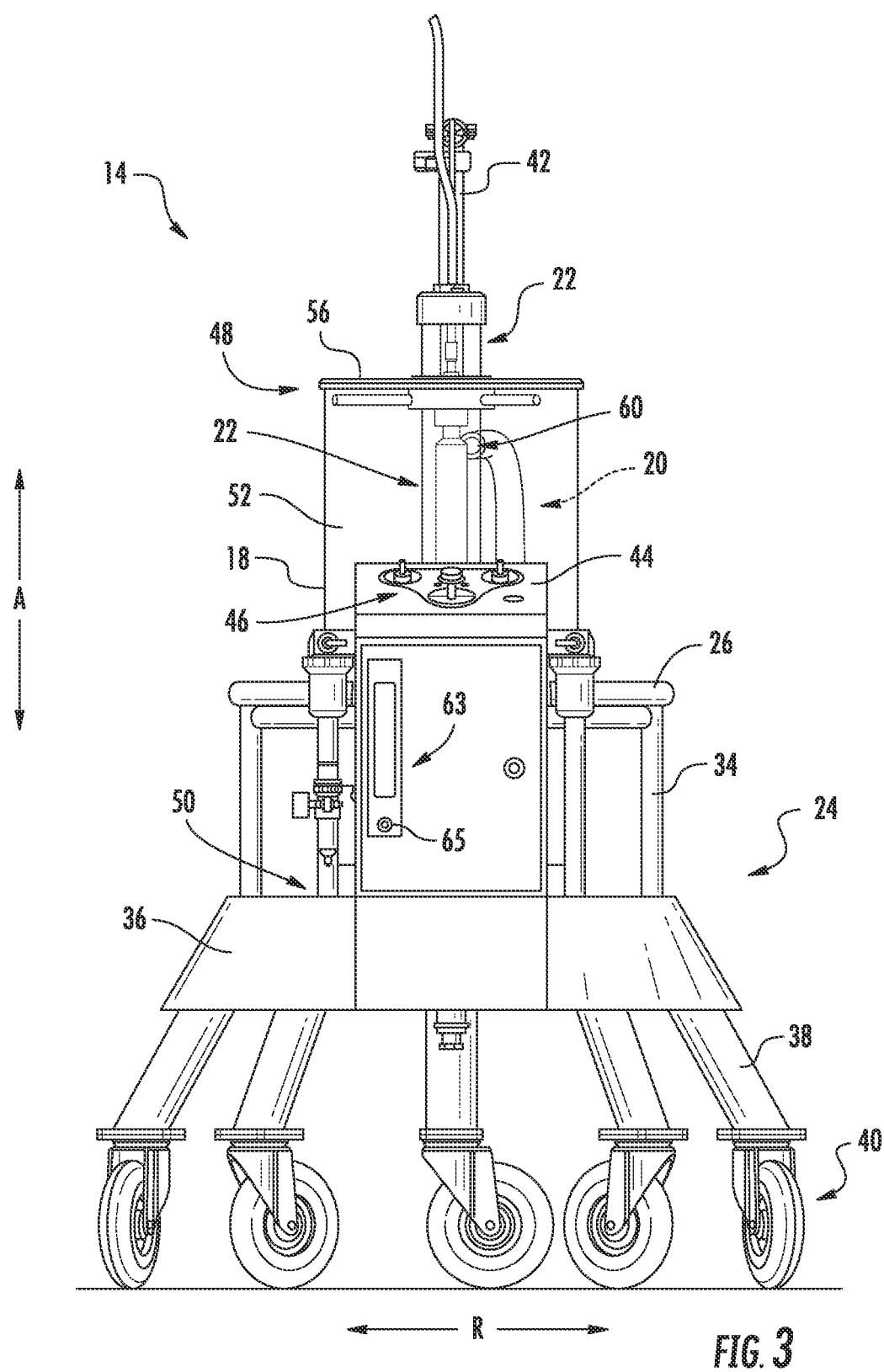
FIG. 3 is a front view of the exemplary alcoholic beverage maturing device of FIG. 2.

Additionally, referring still to FIGS. 1 through 3, for the embodiment depicted, the ultrasonic energy device 22 extends at least partially through the interior volume 20 of the container 18. More particularly, for the exemplary embodiment depicted, the container 18 defines a height H along the axial direction A (FIG. 1), i.e. between the top end 48 and bottom end 50. Additionally, the ultrasonic energy device 22 extends substantially along the height H of the container 18 and substantially along the axial direction A of the alcoholic beverage maturing device 14. It should be appreciated, that as used herein, terms of approximation, such as "about" or "substantially," refer to being within a ten percent margin of error.

Figure 5:
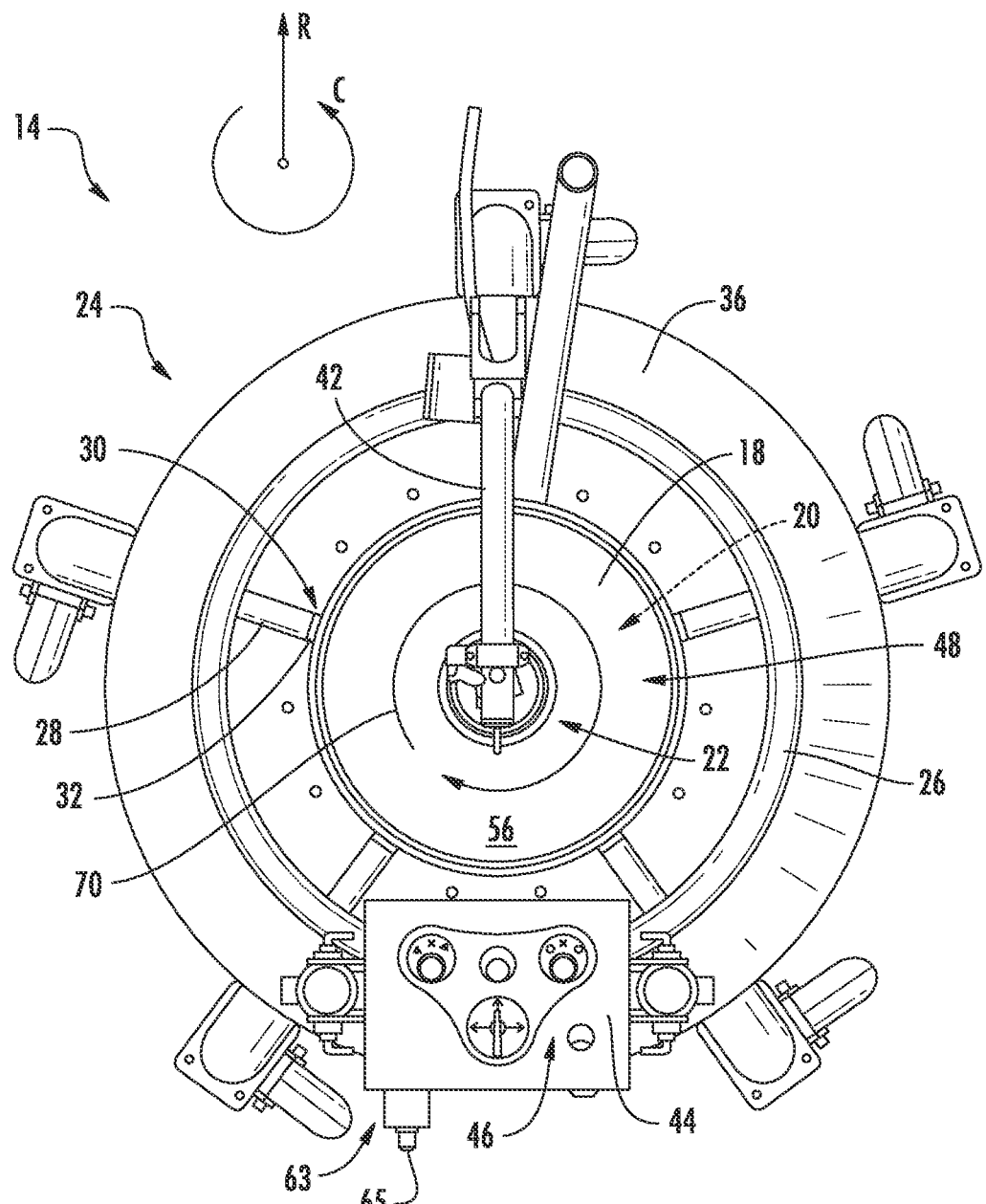
FIG. 5 is a top view of the exemplary alcoholic beverage maturing device of FIG. 2.

Moreover, referring now also to FIG. 5, providing a top view of the exemplary alcoholic beverage maturing device 14 of FIG. 1, the ultrasonic energy device 22 additionally extends substantially through a center of the container 18. Accordingly, with such a configuration, the alcoholic beverage maturing device 14 may maximize the exposure of the alcoholic beverage contained within the interior volume 20 of the container 18 to ultrasonic energy from the ultrasonic energy device 22. More specifically, the ultrasonic energy device 22 for the exemplary alcoholic beverage maturing device 14 depicted defines a range of exposure 70 of ultrasonic energy to the interior volume 20 of the container 18 greater than one hundred eighty (180) degrees. Particularly for the exemplary embodiment depicted, the range of exposure 70 of ultrasonic energy to the interior volume 20 of the container 18, as defined along the circumferential direction C, is approximate three hundred sixty (360) degrees. Additionally, given the substantially cylindrical shape of the container 18, and the position of the ultrasonic energy device 22 extending through a center of the container 18, the alcoholic beverage maturing device 14 may maximize an amount of alcoholic beverage positioned within an effective radius of the ultrasonic energy device 22.

It should be appreciated, that as used herein, the term "range of exposure" refers to an angular range (within a plane, such as a plane perpendicular to the axial direction A) within which a straight line originating at a reference point within a first component (e.g., the ultrasonic energy device 22) may be rotated while still intersecting a second component (e.g., the interior volume 20 of the container 18). Accordingly, with respect to providing ultrasonic energy from the ultrasonic energy device 22, range of exposure of ultrasonic energy refers to an angular range at which ultrasonic energy is provided by the ultrasonic energy device 22 to the interior volume 20 of the container 18.

Figure 6:
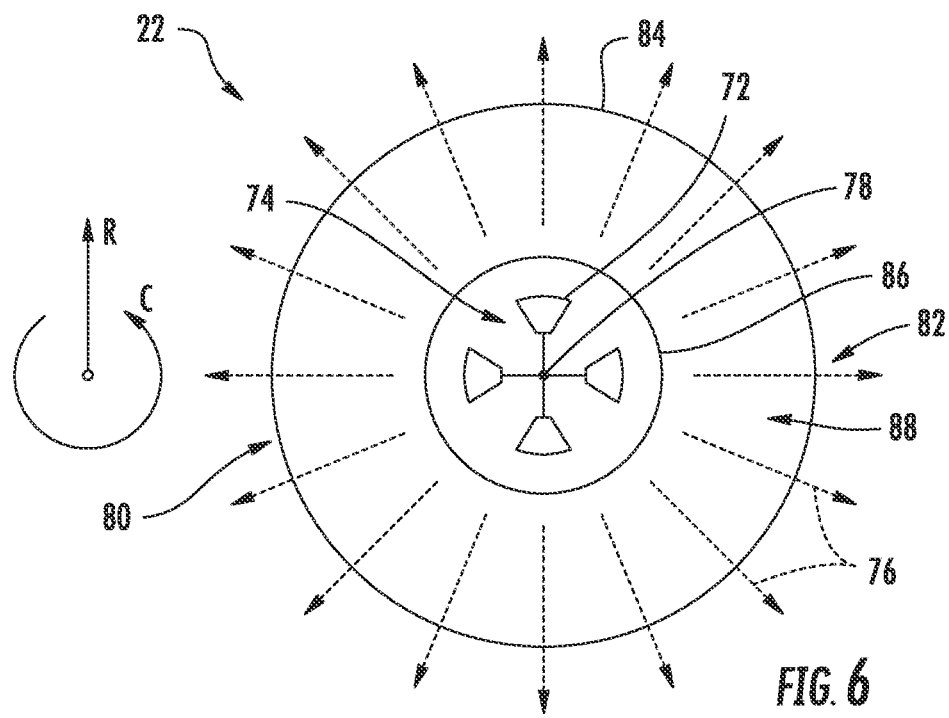
FIG. 6 is a top, simplified schematic view of an ultrasonic energy device in accordance with an exemplary embodiment of the present disclosure.
Figure 7:
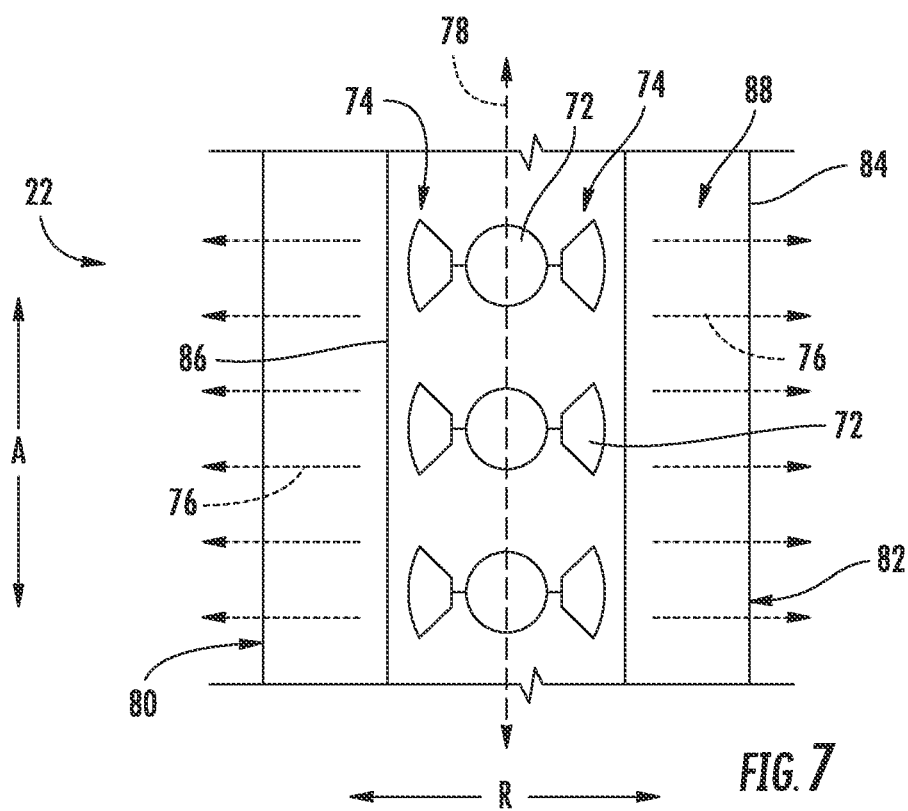
FIG. 7 is a side, simplified schematic view of the exemplary ultrasonic energy device of FIG. 6.

Referring now to FIGS. 6 and 7, schematic, cross-sectional views are provided of an ultrasonic energy device 22 in accordance with an exemplary embodiment of the present disclosure. Specifically, FIG. 6 provides a top, schematic, cross-sectional view of the exemplary ultrasonic energy device 22 along an axial direction A, and FIG. 7 provides a side, schematic, cross-sectional view of the exemplary ultrasonic energy device 22 along a radial direction R. The ultrasonic energy device 22 of FIGS. 6 and 7 may be configured in substantially the same manner as the exemplary ultrasonic energy device 22 of FIGS. 1 through 5, and thus the same or similar numbering may refer to same or similar parts.

In at least certain exemplary embodiments, the ultrasonic energy device 22 includes one or more speakers 72 for producing ultrasonic energy. Specifically, for the embodiment depicted, the ultrasonic energy device 22 includes a plurality of speakers 72 for producing ultrasonic energy. The ultrasonic energy device 22 is configured to subject the alcoholic beverage within the interior volume 20 of the container 18 to the ultrasonic energy produced by the plurality of speakers 72. In certain exemplary embodiments, the plurality of speakers 72 may include one or more arrays 74 of speakers 72 (FIG. 7), each array 74 including a plurality of speakers 72 spaced along the axial direction A. For the embodiment depicted, the ultrasonic energy device 22 includes four arrays 74 of axially oriented speakers 72, each array 74 spaced along the circumferential direction C. With such a configuration, the ultrasonic energy device 22 may be capable of providing ultrasonic energy in a range of directions (indicated by arrows 76) up to about three hundred sixty (360) degrees along the circumferential direction C relative to an axial centerline 78 of the ultrasonic energy device 22. For example, the ultrasonic energy device 22 may be positioned to subject the alcoholic beverage within the interior volume 20 of the container 18 to ultrasonic energy from a first side 80 in a first direction and from a second and opposite side 82 in a second and opposite direction.

Notably, for the embodiment depicted, each of the speakers 72 may be configured as unidirectional speakers providing ultrasonic energy in a relatively small (e.g., approximately 90 degrees) range of directions. It should be appreciated, however, that in other exemplary embodiments, one or more of the speakers 72 may be configured as omnidirectional speakers providing ultrasonic energy in a relatively large range of directions (e.g., 180 degrees, 270 degrees, 360 degrees). With such a configuration, the ultrasonic energy device may simply include a single omnidirectional speaker for providing the ultrasonic energy in the desired range of directions. Additionally, in still other embodiments, the plurality of speakers 72 may alternatively be arranged in any other suitable configuration. For example, instead of axially extending arrays 74 of speakers 72, the ultrasonic energy device 22 may include one or more spiraled or helical shape arrays of speakers.

The speakers 72 may include any suitable speaker technology for generating ultrasonic energy. For example, in certain exemplary embodiments, one or more of the plurality of speakers 72 may include any suitable dynamic loudspeaker technology, such as a push-pull speaker technology. Additionally, the speakers 72 may be configured to provide a wide range of ultrasonic energy to the interior volume 20 of the container 18. For example, in certain exemplary embodiments, the ultrasonic energy provided by the plurality of speakers 72 can be at a power of at least about three Watts/liter, such as at least about five Watts/liter, or more specifically between about ten and about eighty Watts/liter. Moreover, the ultrasonic energy provided by the plurality of speakers 72 of the ultrasonic energy device 22 can be at a frequency greater than about 20,000 Hz, more specifically between about 20,000 and about 170,000 Hz. For example in one embodiment, the ultrasonic energy can be at a frequency greater than about 35,000 Hz. For instance, in one embodiment, the ultrasonic energy can be at a frequency of about 80,000 Hz. Of course, in other embodiments, the plurality of speakers 72 may provide ultrasonic energy at any other suitable power level or at any other suitable frequency.

Moreover, as may be seen in FIGS. 6 and 7, the ultrasonic energy device 22 includes an outer enclosure 84 and an inner housing 86. The plurality of speakers 72 of the ultrasonic energy device 22 are positioned within the outer enclosure 84 and inner housing 86. More particularly, the plurality speakers 72 of the ultrasonic energy device 22 are positioned within the inner housing 86. For example, the plurality of speakers 72 and inner housing 86 may be a prefabricated unit positioned within the ultrasonic energy device 22. The ultrasonic energy device 22 additionally includes a liquid surrounding the plurality speakers 72 within the outer enclosure 84. Specifically, the liquid is positioned in an annular void 88 defined between the outer enclosure 84 and inner housing 86 of the ultrasonic energy device 22. The liquid may be any suitable liquid for transferring the ultrasonic energy. For example, the liquid may be water, a water mixture having one or more additives, a distilled liquid, or any other suitable liquid. Notably, inclusion of an intermediate liquid within the annular void 88 surrounding the inner housing 86 may prevent a contamination of the alcoholic beverage within the inner volume 20 of the container 18. For example, wherein the inner housing 86 and speakers 72 are configured as a prefabricated unit, the inner housing 86 may be formed of a material that may degrade when exposed to alcohol and the ultrasonic energy produced. The degradation of the inner housing 86 may contaminate the liquid to which it is exposed. Accordingly, inclusion of an intermediate liquid within the annular void 88, separated by the outer enclosure 84, may prevent any such contamination from reaching any alcohol beverage being distilled within the container 18.

The ultrasonic energy device 22, or more particularly, the plurality of speakers 72 of the ultrasonic energy device 22 may be in electrical communication with a power source. For example, in at least certain exemplary embodiments, such as the embodiment depicted, the plurality speakers 72 may be in wired communication with a power source. The power source may be a central power source for powering each of the plurality of speakers 72. Moreover, the power source may be contained within the ultrasonic energy device 22, or alternatively, the power source may be external to the ultrasonic energy device 22. For example, the power source may be a building utility line connected to the ultrasonic energy device 22 and the plurality of speakers 72 therein through one or more electrical lines. The one or more electrical lines may be attached to the ultrasonic energy device 22 and suspended from the vertical support bar 42 of the frame 24 of the energy device 22 (see FIGS. 1 through 3). Alternatively, one or more of the plurality of speakers 72 may include an individual power source, such as a battery or battery pack, for powering such speakers 72.

The ultrasonic energy device 22 may be operably connected to a plurality of controls of the alcoholic beverage maturing device 14 of which the ultrasonic energy device 22 is included. For example, the plurality of controls may be configured as the controls 46 on the control panel 44 described above with reference to the embodiment of FIGS. 1 through 3. The controls 46 may allow a user to change a frequency and/or power level of the ultrasonic energy device 22 as desired.

An alcoholic beverage maturing device in accordance with exemplary aspects of the present disclosure may allow for efficiently subjecting an alcoholic beverage to ultrasonic energy to mature such alcoholic beverage. More particularly, by positioning an ultrasonic energy device capable of generating ultrasonic energy and a wide range of directions within a container at a location such that an exposure of the ultrasonic energy device to the alcoholic beverage within the container is maximized, the alcoholic beverage may be more efficiently subjected to the ultrasonic energy as desired.

Figure 8:
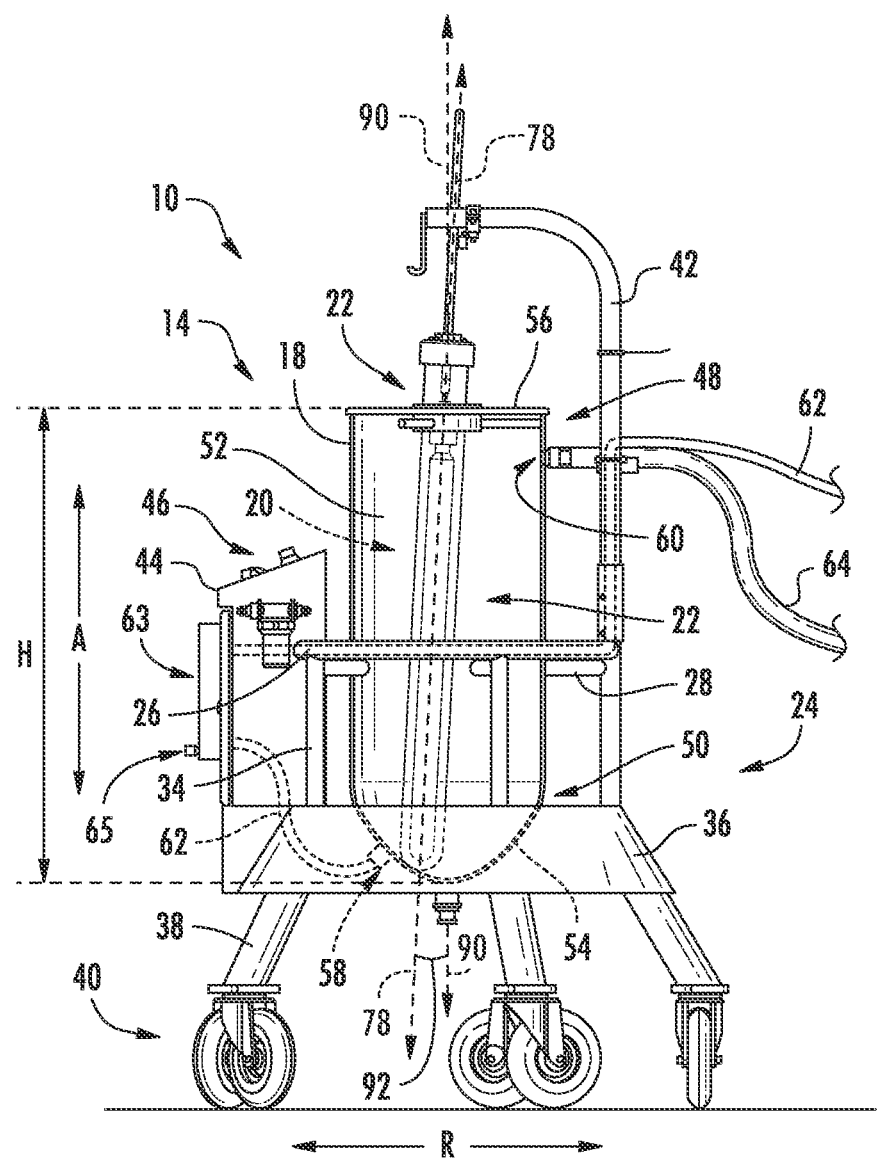
FIG. 8 is a side view of an alcoholic beverage maturing device in accordance with another exemplary embodiment of the present disclosure.

Referring now to FIG. 8, a side view of an exemplary alcoholic beverage maturing device 14 in accordance with another exemplary embodiment of the present disclosure is provided. The exemplary alcoholic beverage maturing device 14 of FIG. 8 may be configured in substantially the same manner as the exemplary alcoholic beverage maturing device 14 described above with reference to FIGS. 1 through 5. For example, as shown, the exemplary alcohol beverage maturing device 14 generally includes a container 18 defining an interior volume 20 for holding an alcoholic beverage, and an ultrasonic energy device 22 for subjecting the alcohol beverage within the interior volume 20 of the container 18 to ultrasonic energy. Similar to the exemplary embodiment above, for the exemplary alcoholic beverage maturing device 14 of FIG. 8, the ultrasonic energy device 22 extends generally along the height H of the container. Notably, however, for the exemplary embodiment of FIG. 8, the ultrasonic energy device 22 does not extend exactly along an axial direction A of the maturing device 14. More particularly, for the embodiment of FIG. 8, the ultrasonic energy device 22 defines a central axis 78, and the container 18 also defines a central axis 90. The central axis 90 of the container 18 for the embodiment depicted is parallel to the central axis 15 of the maturing device 14 and axial direction A (FIG. 1). Additionally, for the embodiment depicted, the central axis 78 of the ultrasonic energy device 22 is offset from the central axis 90 of the container 18. Specifically, the central axis 78 of the ultrasonic energy device 22 defines an angle 92 with the central axis 90 of the container 18. In certain embodiments, the angle 92 between the central axis 78 of the ultrasonic energy device 22 and the central axis 90 of the container 18 may be between one degree and about fifteen degrees. For example, the angle 92 may be between about two degrees and about ten degrees, such as between about three degrees and about eight degrees. Such a configuration may assist with maintaining integrity of the container 18, by preventing or minimizing an amount of standing waves/stationary waves generated between the ultrasonic energy device 22 and an outer wall of the container 18.

Figure 9:
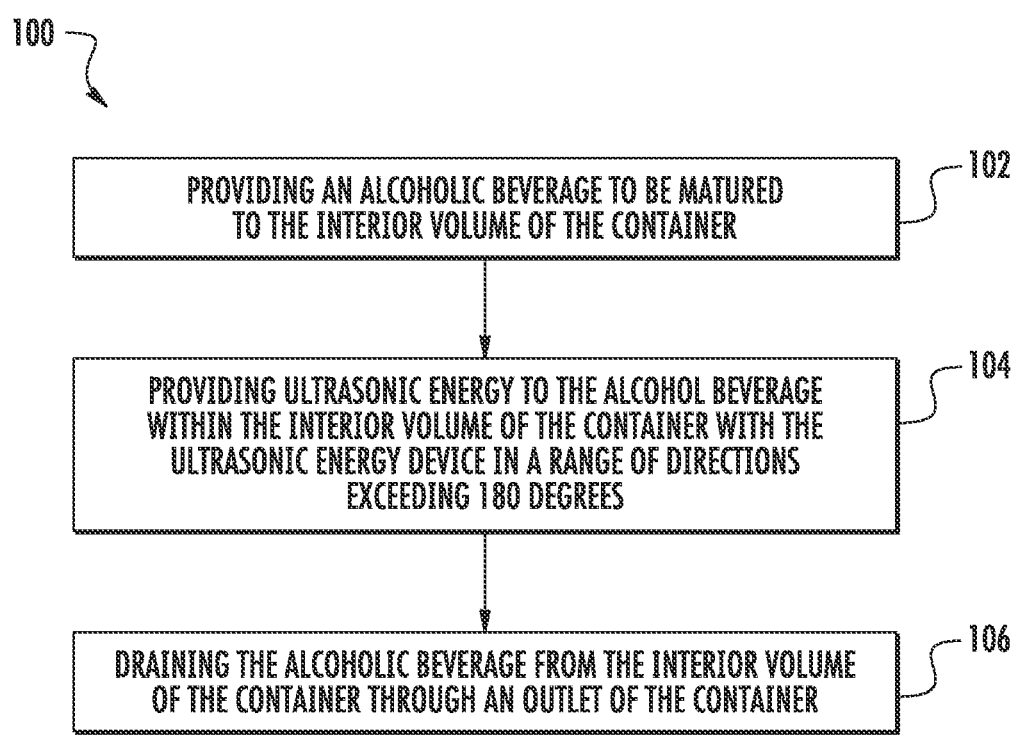
FIG. 9 is a flow diagram of a method for maturing an alcoholic beverage in accordance with an exemplary aspect of the present disclosure.

Referring now to FIG. 9, a method of maturing an alcoholic beverage using an alcoholic beverage maturing device is provided. The exemplary method (100) may mature an alcoholic beverage utilizing the exemplary alcoholic beverage maturing device 14 described above with reference to FIGS. 1 through 5, or any other suitable alcohol beverage maturing device 14 (such as the exemplary alcohol beverage maturing device 14 described above reference to FIG. 8). Accordingly, the exemplary method (100) may utilize and alcoholic beverage maturing device including a container having an interior volume and an ultrasonic energy device. The ultrasonic energy device may define a range of exposure to the interior volume greater than one hundred and eighty degrees.

The exemplary method (100) includes at (102) providing an alcoholic beverage to be matured to the interior volume of the container. In certain exemplary aspects, providing the alcoholic beverage to be matured to the interior volume of the container at (102) may include gravity feeding the alcoholic beverage to be matured to the interior volume of the container from an infeed storage tank.

The exemplary method (100) additionally includes at (104) providing ultrasonic energy to the alcoholic beverage within the interior volume of the container with the ultrasonic energy device in a range of directions exceeding one hundred and eighty degrees. More specifically, in certain exemplary aspects, providing ultrasonic energy to the alcoholic beverage within the interior volume of the container at (104) may further include providing ultrasonic energy to the alcoholic beverage within the interior volume of the container with the ultrasonic energy device in a range of directions of approximately three hundred and sixty degrees.

Referring still to FIG. 9, the exemplary method (100) additionally includes at (106) draining the alcoholic beverage from the interior volume of the container through an outlet of the container positioned proximate a top end of the container.

Moreover, it should be appreciated, that although the exemplary systems 10 described above with reference to FIGS. 1 through 5, and with reference to FIG. 8, are used to mature an alcoholic beverage, in other exemplary embodiments, the exemplary system, including the maturing device, may not be configured to mature in alcohol beverage, and instead may be used to mature, e.g., biofuels, vinegar or other food products, perfumes, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An alcoholic beverage maturing device comprising:
   a container comprising an outer wall and defining an interior volume within the outer wall for holding an alcoholic beverage; and
   an ultrasonic energy device for subjecting the alcoholic beverage within the interior volume of the container to ultrasonic energy, wherein the ultrasonic energy device includes one or more speakers for producing ultrasonic energy, wherein the ultrasonic energy device is configured to subject the alcoholic beverage within the interior volume of the container to the ultrasonic energy from the one or more speakers, wherein the ultrasonic energy device includes an enclosure and wherein the one or more speakers are positioned within the enclosure, wherein the ultrasonic energy device further includes an inner housing surrounding the one or more speakers and a liquid surrounding the inner housing within the enclosure, the ultrasonic energy device defining a range of exposure of ultrasonic energy to the interior volume of the container greater than 180 degrees, wherein ultrasonic energy from the ultrasonic energy device is directed towards an inner surface of the outer wall.

2. The alcoholic beverage maturing device of claim 1, wherein the range of exposure of ultrasonic energy to the interior volume of the container is about 360 degrees.

3. The alcoholic beverage maturing device of claim 1, wherein the alcoholic beverage maturing device defines an axial direction and a circumferential direction, and wherein the range of exposure is defined along the circumferential direction.

4. The alcoholic beverage maturing device of claim 1, wherein the ultrasonic energy device is positioned to subject the alcoholic beverage within the interior volume of the container to ultrasonic energy from a first side in a first direction and from a second and opposite side in a second and opposite direction.

5. The alcoholic beverage maturing device of claim 1, wherein the one or more speakers include an array of push-pull speakers.

6. The alcoholic beverage maturing device of claim 1, wherein the one or more speakers provide a power of at least about three Watts/liter based on a volume of the container.

7. The alcoholic beverage maturing device of claim 1, wherein the ultrasonic energy device extends at least partially through the container.

8. The alcoholic beverage maturing device of claim 1, wherein the alcoholic beverage maturing device defines an axial direction, and wherein the ultrasonic energy device extends substantially along the axial direction.

9. The alcoholic beverage maturing device of claim 1, wherein the ultrasonic energy device extends substantially through a center of the container.

10. The alcoholic beverage maturing device of claim 1, wherein the alcoholic beverage maturing device defines an axial direction, wherein the container defines a height along the axial direction, and wherein the ultrasonic energy device extends substantially along the height of the container.

11. The alcoholic beverage maturing device of claim 1, wherein the container defines a central axis, wherein the ultrasonic energy device defines a central axis, and wherein the central axis of the ultrasonic energy device defines an angle with the central axis of the container that is greater than one degree and less than about fifteen degrees.

12. The alcoholic beverage maturing device of claim 11, wherein the angle defined by the central axis of the ultrasonic energy device with the central axis of the container is greater than two degrees and less than about fifteen degrees.

13. The alcoholic beverage maturing device of claim 1, wherein the container defines an inlet and a separate outlet.

14. The alcoholic beverage maturing device of claim 13, wherein the outlet is positioned proximate a top end of the container, and wherein the inlet is positioned proximate a bottom end of the container.

15. The alcoholic beverage maturing device of claim 13, wherein the inlet defines an inlet flow direction, wherein the container further defines a central axis and a radial reference line extending from the inlet to the central axis of the container, and wherein the inlet flow direction defines an angle with the radial reference line greater than zero.

16. The alcoholic beverage maturing device of claim 15, wherein the angle defined between the inlet flow direction with the radial reference line is between about five degrees and about eighty-five degrees.

17. The alcoholic beverage maturing device of claim 13, wherein the alcoholic beverage device is configured for maturing a continuous flow of alcoholic beverages between the inlet and the outlet.

18. The alcoholic beverage maturing device of claim 17, further comprising a flow metering device in fluid communication with the inlet of the container for metering a flowrate of alcoholic beverage to the container of the alcoholic beverage maturing device.

19. The alcoholic beverage maturing device of claim 1, wherein the alcoholic beverage is at least one of a vodka, a tequila, a rum, a bourbon, a scotch, a brandy, or a wine.

20. An alcoholic beverage maturing device comprising:
a container comprising an outer wall and defining an interior volume within the outer wall for holding an alcoholic beverage;
an enclosure;
an ultrasonic energy device including one or more speakers positioned within the enclosure, the ultrasonic energy device configured for subjecting the alcoholic beverage within the interior volume of the container to ultrasonic energy, the ultrasonic energy device defining a range of exposure of ultrasonic energy to the interior volume of the container greater than 180 degrees, wherein ultrasonic energy from the ultrasonic energy device is directed towards an inner surface of the outer wall, and wherein the ultrasonic energy device further includes an inner housing surrounding the one or more speakers and a liquid surrounding the inner housing within the enclosure.

21. The alcoholic beverage maturing device of claim 20, wherein the range of exposure of ultrasonic energy to the interior volume of the container is about 360 degrees.

22. The alcoholic beverage maturing device of claim 20, wherein the alcoholic beverage maturing device defines an axial direction, and wherein the ultrasonic energy device extends substantially along the axial direction.

* * * * *